Aug. 24, 1965 B. G. BENDER ETAL 3,202,489

GOLD-ALUMINUM ALLOY BOND ELECTRODE ATTACHMENT

Filed Dec. 1, 1959 2 Sheets-Sheet 1

INVENTORS,
BOB G. BENDER,
LEONARD BERNSTEIN

BY Charles S. Haughey
ATTORNEY

Aug. 24, 1965 B. G. BENDER ETAL 3,202,489

GOLD-ALUMINUM ALLOY BOND ELECTRODE ATTACHMENT

Filed Dec. 1, 1959 2 Sheets-Sheet 2

375°C - 1 MIN

425° C - 1 MIN

450° C - 1 HR

INVENTORS,
BOB G. BENDER,
LEONARD BERNSTEIN

BY Charles S. Haughey
ATTORNEY 3,202,489

GOLD-ALUMINUM ALLOY BOND ELECTRODE ATTACHMENT

Bob G. Bender, Garden Grove, and Leonard Bernstein, Fullerton, Calif., assignors to Hughes Aircraft Company, Culver City, Calif., a corporation of Delaware Filed Dec. 1, 1959, Ser. No. 856,389
5 Claims. (Cl. 29—195)

This invention relates to gold-aluminum alloy bonds for attaching electrodes to semiconductor materials, and to a process utilizing a special alloy material in making such a bond.

In the making of alloy bonds to semiconductors it has been noted that when gold and aluminum are present at the bonding zone, a purple, brittle phase often occurs. This phase may mechanically separate an electrode from a semiconductor to which it is being bonded, thus causing failure of the bonding. When this purple phase is present in sufficient quantities, the bonded electrode is actually separated upon cooling, as by a spalling mechanism, in some case, and in other cases the bond is so brittle as to break and fail under minimal shock or stress. This purple phase has been tentatively identified as $AuAl_2$, and is so referred to hereinafter.

When gold is used to alloy bond a silver electrode to an aluminum silicon eutectic surface, even though the above noted purple phase $AuAl_2$ is avoided or reduced to unimportant proportions, the gold preferentially wets and dissolves the silver as compared to the wetting of the aluminum-silicon, and by preferentially flowing a substantial volume of bonding alloy on to the electrode, a reduced bonding area between the electrode and the aluminum-silicon surface is formed. This results in an "hourglass" form of attachment, with a point of mechanical weakness adjacent the aluminum-silicon surface.

When gold is used as a bonding alloy in silicon semiconductor device fabrication, the bond often penetrates so deeply as to destroy or short out the PN junction.

In the semiconductor device fabrication art, aluminum is known as a preferred electrical conductivity type determining impurity, or dopant, particularly in working with silicon semiconductor crystals. It is also known that attachment of electrodes, or leads, to aluminum-silicon surfaces has heretofore required special measures to procure a satisfactory bond. Such measures include two step processess in which the semiconductor crystal is reheated, the use of special fluxes, and agitation or vibration to remove or penetrate aluminum oxide films and produce alloy bonding. These expedients increase manufacturing costs, increase risk of semiconductor device contamination or failure, and often produce bonds having insufficient oxidation resistance to allow cleaning by acid etchants such as hydrofluoric acid and nitric acid as are commonly used in the art.

The objects and advantages of this invention include the avoidance of excessive amounts of the above noted brittle purple phase $AuAl_2$, the avoidance of hourglass attachments of electrodes to aluminum-silicon surface phases of semiconductor devices, the avoidance of excessively deep penetration in gold alloy bonding, the production of acid etchant resistant alloy bonds, and the improvement of the mechanical and electrical attachment of the electrodes to semiconductor devices.

The above and other objects and advantages of this invention will be explained by or be made apparent from the following disclosure and the preferred embodiments of the invention as illustrated therein and in the drawings, in which.

Figure 1:
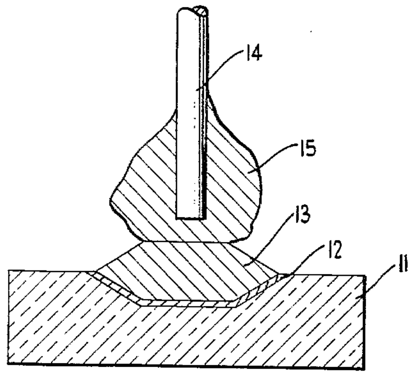
FIG. 1 is a cross-sectional view of an assembly for alloy bonding according to the present invention.

An aluminum-silicon eutectic surface is produced in semiconductor device manufacture by alloying aluminum on to a silicon semiconductor crystal to produce a PN junction. Satisfactory junctions are easily produced in this manner, but the attachment of leads or electrodes to the predominantly aluminum surface phase is difficult, as above noted. According to the present invention a low melting alloy of gold and tin is used as a bonding alloy to bond leads to such predominantly aluminum surfaces without requiring the use of fluxes, or agitation. An alloy of gold and tin is used having a melting point sufficiently low that the formation of the deleterious purple phase may be avoided. An eutectic mixture of about 80% gold and 20% tin by weight has a melting point 280° C. and makes a very satisfactory bonding alloy. This predominantly gold bonding alloy will form a bond to a predominantly aluminum phase at temperatures above its 280° C. melting point without requiring a special flux, and produces an etch-resistant, strong, shallow penetration bond which may be cleaned without deleterious effects.

It has been found that when gold and aluminum are present in a bonding operation, a purple, brittle $AuAl_2$ phase may be formed. Above a critical temperature this phase forms rapidly, and it produces an unsatisfactory bond. Usually a small, discontinuous purple phase is formed at temperatures as low as 25° C. below the critical temperature, but unless the critical temperature is exceeded, no such rapid phase transformation takes place. Aluminum and gold may be held just below the critical, rapid phase transformation temperature for several minutes without forming substantial volumes of the purple phase, but just above that temperature a few seconds to minutes are sufficient to form volumes which would require one to several hours to form below the critical temperature. By holding the bonding temperature below the $AuAl_2$ rapid phase transformation temperature, deleterious formation of $AuAl_2$ is avoided.

Formation of the purple $AuAl_2$ phase has been found to occur above 625° C. in prepared mixtures of stoichiometric proportions of gold and aluminum to form $AuAl_2$. 625° C. is the reported phase transformation temperature for $AuAl_2$. In mixtures of gold, aluminum and silicon the purple $AuAl_2$ phase is observed to occur rapidly above 525° C. In mixtures of gold, aluminum, silicon and tin, the purple $AuAl_2$ phase is observed to occur rapidly above 410° C. By utilizing an alloy of gold and tin which melts below 410° C., an alloy bond may be made to aluminum-silicon at temperatures below 410° C., and formation of deleterious $AuAl_2$ may be avoided.

Alloys of tin and gold having between 68% and 82% gold by weight, the balance tin, have melting temperatures below 410° C. Alloys with substantially less than 68% gold (below about 60%) and the balance tin also have melting temperatures below 410° C. but lack the desirable characteristics of etch-resistance and ease of bonding which are possessed by the mixtures contained in 68% to 82% gold.

In making an attachment according to the preferred method of this invention, aluminum is first fused to a silicon semiconductor crystal by any conventional process, such as placing a sphere of aluminum on the crystal surface and heating to 700° C., then cooling to recrystallize a region of P-type silicon and form a predominantly aluminum surface. As illustrated in FIG. 1 the silicon semiconductor crystal 11 having a P-type regrown region 12 and a predominantly aluminum surface 13, formed by the above described fusion process, is assembled with a lead or electrode 14, having a coating 15 of 80%–20% gold tin thereon formed by dipping into molten bonding alloy. Alternatively, a preformed ring of gold tin alloy, may be assembled with the lead and the aluminum-silicon surface 13 of the crystal 11. The assembly is then heated to a temperature above the melting point of the gold tin alloy and below 410° C., to melt the bonding alloy 15 and fuse it to the aluminum-silicon surface 13 to form a mechanical and electrical bond therebetween. The preferred temperature for bonding operation is 375° C. for rapid and effective bond formation without excessive formation of the deleterious purple phase.

While the lead 14 may be any conventional lead, silver is often preferred for its relative stiffness and its thermal and electrical conductivity. It has been found that silicon needles in aluminum-silicon eutectic are very soluble in gold-tin, and will often serve as a path for penetration of the bonding alloy into the PN junction, producing a short. This solubility is reduced by addition of silver to the bonding alloy in small quantities, because the melting temperture of the alloy then increases more rapidly as the silicon is dissolved. Large additions of silver produce a brittle joint between the silver lead and the gold bond. Small silver additions which successfully inhibit penetration of the gold-tin bonding alloy are preferably made by using a silver lead coated with gold or platinum. The coating reduces the solubility of the silver along its cylindrical surface, so that only its end surface dissolves substantially. Thus a coated silver lead provides corrosion or etch resistance, stiffer properties than an all gold wire, and small quantity silver solution into the bonding alloy to further reduce dissolution of silicon needles in the aluminum silicon eutectic. The silver could, of course, be introduced directly into the gold-tin alloy, to a limit of about 5% by weight, before raising the melting point above the working temperature range of 375° to 410° C.

Figure 2:
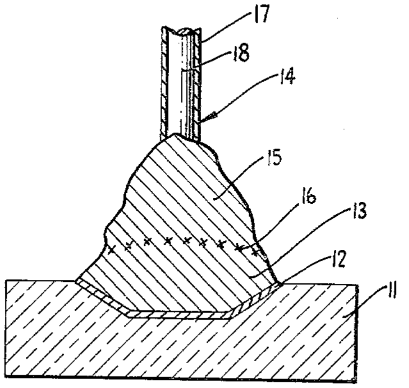
FIG. 2 is a cross-sectional view of a satisfactory alloy bond formed from the assembly of FIG. 1.
Figure 3:
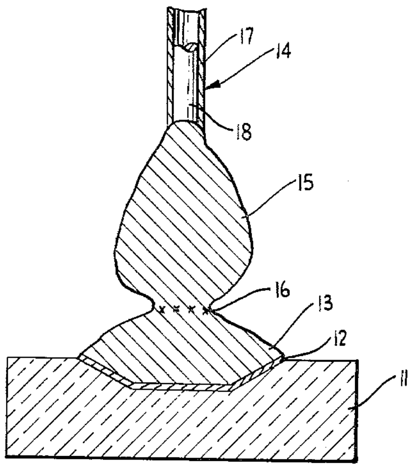
FIG. 3 shows a type of alloy bond which may be improved according to this invention.

In working with gold-tin bonding alloys it was found that they easily wet and bond to gold clad silver leads, or to aluminum-silicon eutectic, but, in the presence of both, the lead was preferentially wet, forming an hourglass attachment as shown in FIG. 3, wherein a lead 14, having a silver core 18 and clad with gold 17, is bonded with 80% gold, 20% tin bonding alloy to the aluminum-silicon eutectic 13, at bond 16, of crystal 11. This hourglass attachment was avoided in FIG. 2 by adding indium to the bonding alloy. Up to about 10% indium is satisfactory to improve wettability of the gold-tin alloy, with 2 to 5% being preferred. The attachment illustrated in FIG. 2 was accordingly made with a gold clad silver wire, bonded with an alloy of 78% gold, 20% tin, and 2% indium to an aluminum-silicon eutectic surface on a silicon semiconductor device. It is noted that the indium is not required with platinum clad silver wire, and an excellent bond to the aluminum-silicon eutectic surface 13 is provided. Other additions of minor constituents may be made to the gold-tin alloy so long as its melting temperature is not raised above the desired bonding temperature. For example, up to 1% gallium may be added to insure sufficient P-type dopant in the bond.

Figure 4:
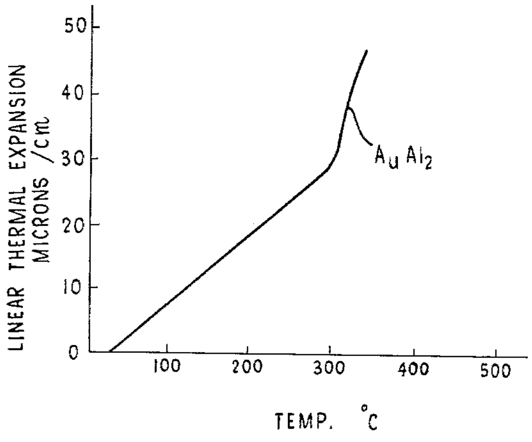
FIG. 4 is a chart of the linear thermal expansion of $AuAl_2$.

FIG. 4 shows the linear coefficient of thermal expansion of $AuAl_2$ in microns per centimeter, plotted against temperature in degrees C. The resulting curve is substantially linear from room temperature to about 300° C., but from about 300° C. the slope increases with temperature. This change in the rate of thermal expansion is believed to account for the tendency of the purple phase to spall away from an adjacent surface upon cooling where there is a substantially continuous purple phase present in an alloy bond.

Figure 5:
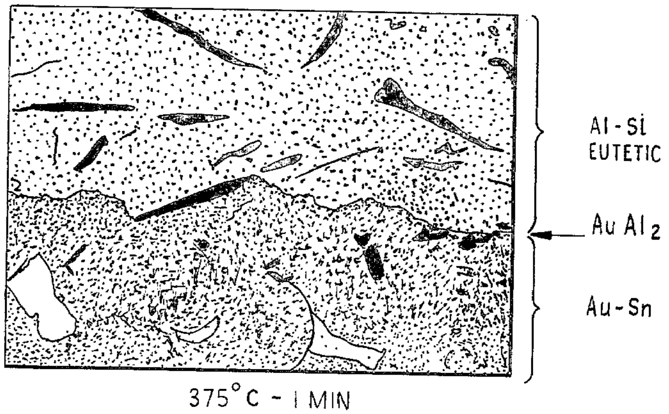
FIG. 5 represents a photomicrograph of an alloy bond formed according to this invention.

FIG. 5 represents a photomicrograph at 900 diameters magnification of a bond formed in one minute at 375° C. and showing a minute and discontinuous $AuAl_2$ phase between an aluminum-silicon eutectic phase and a gold-tin alloy phase. This makes a highly satisfactory bond.

Figure 6:
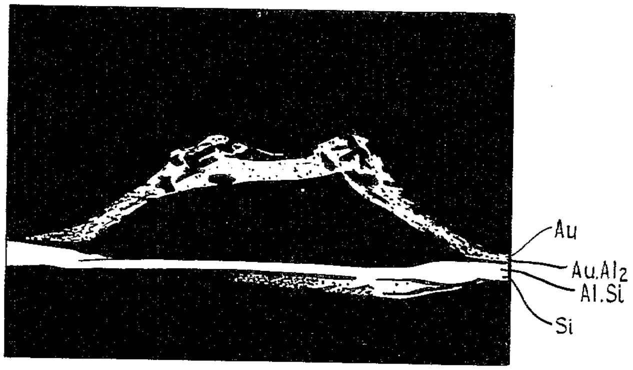
FIG. 6 represents a photomicrograph of an eruption in a bond due to $AuAl_2$.

FIG. 6 represents a photomicrograph at 50 diameters magnification of a mechanically weak bond formed with an excessive volume of $AuAl_2$, in which the bond has erupted or spalled to failure.

Figure 7:
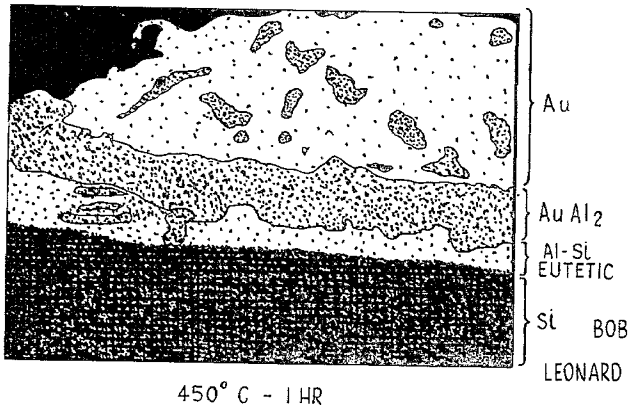
FIG. 7 represents a photomicrograph showing excessive $AuAl_2$ formed in a bond.

FIG. 7 represents a photomicrograph at 900 diameters magnification of a bond formed by holding for one hour at 450° C. with the resulting formation of a substantial and continuous purple phase $AuAl_2$ between aluminum-silicon and gold phases, without tin. This represents the volume of $AuAl_2$ obtained by bonding above the rapid phase transformation temperature, but the $AuAl_2$ tends to fracture in rapid transformation.

The foregoing examples illustrate a composition range of shallow-bonding, etch resistant alloys for forming strong, reliable bonds to aluminum-silicon eutectic, or predominantly aluminum, surfaces on silicon semiconductor devices, together with some special modifications and improvements for special purposes which do not detract from the prime function of the bonding alloy in forming a bond without deleterious excessive and rapid formation of the purple $AuAl_2$ brittle phase.

What is claimed is:

1. A method of attaching electrodes to an aluminum-silicon surface on a silicon semiconductor device, which comprises: assembling an electrode, an essentially gold-tin eutectic bonding alloy of 80% gold and 20% tin by weight and having a melting temperature below 410° C., and a semiconductor material having an aluminum-silicon surface; heating the assembly to a bonding temperature between the melting temperature of said alloy and 410° C.; and cooling the assembly.

2. The method of attaching electrodes to a predominantly aluminum surface of a silicon semiconductor material, which comprises: assembling an electrode, a gold rich, essentially gold-tin bonding alloy consisting essentially of 80% gold and 20% tin by weight having a melting temperature below 410° C. and said predominantly aluminum surface; heating the assembly to a bonding temperature above the melting point of said alloy and below 410° C.; and cooling said assembly.

3. A bonding alloy for bonding electrodes to aluminum coated silicon semiconductor material, said alloy consisting essentially of at least 68% gold by weight, an effective amount of indium to improve wetting of a predominantly aluminum surface in the presence of a gold surface, and the balance tin, said alloy having a melting temperature below 410° C.

4. A bonding alloy for bonding electrodes to aluminum coated silicon semiconductor material, said alloy consisting essentially of at least 68% gold by weight, an effective amount of silver to reduce solubility of silicon in the alloy, the balance tin, and having a melting temperature below 410° C.

5. A semiconductor device comprising a silicon type semiconductor crystal, a predominantly aluminum surface on said crystal and an electrode bonded to said surface at a bonding temperature below 410° C. with an alloy consisting essentially of between 68 and 82% gold by weight and the balance tin.

References Cited by the Examiner

UNITED STATES PATENTS

| | | | |
|---|---|---|---|
| 446,618 | 2/91 | Burdon | 29—199 |
| 1,947,180 | 2/34 | Bart. | |
| 2,427,727 | 9/47 | Huntly et al. | 29—199 |
| 2,782,492 | 2/57 | Frost | 29—155.5 |
| 2,793,420 | 5/57 | Johnston et al. | 29—155.5 |
| 2,798,013 | 7/57 | Irmler | 148—1.5 |
| 2,805,370 | 9/57 | Wilson | 317—240 |
| 2,811,682 | 10/57 | Pearson | 317—240 |
| 2,877,396 | 3/59 | Armstrong et al. | 29—504 X |
| 2,937,439 | 5/60 | Le May | 29—504 X |

OTHER REFERENCES

Constitution of Binary Alloys, by Hansen, pages 232–234, published in 1958, by McGraw-Hill Book Co., New York, N.Y.

JOHN F. CAMPBELL, *Primary Examiner.*

SAMUEL BERNSTEIN, WHITMORE A. WILTZ, *Examiners.*